United States Patent [19]

Shu

[11] Patent Number: 4,809,782
[45] Date of Patent: Mar. 7, 1989

[54] BLOCK COPOLYMERS USEFUL FOR ENHANCED OIL RECOVERY PROCESSES

[75] Inventor: Paul Shu, Princeton JCT., N.J.

[73] Assignee: Mobil Oil Corporation, New York, N.Y.

[21] Appl. No.: 2,610

[22] Filed: Jan. 16, 1987

Related U.S. Application Data

[63] Continuation of Ser. No. 780,133, Sep. 25, 1985, abandoned.

[51] Int. Cl.[4] ............................................. E21B 43/25
[52] U.S. Cl. .................................... 166/275; 166/295; 252/8.514
[58] Field of Search .......................... 252/8.558, 8.514; 166/275, 270, 268, 292, 295

[56] References Cited

U.S. PATENT DOCUMENTS

| | | | |
|---|---|---|---|
| 4,002,589 | 1/1977 | Farley et al. | 525/59 |
| 4,485,211 | 11/1984 | Okamoto | 525/59 |
| 4,653,585 | 3/1987 | Chung et al. | 166/275 |
| 4,658,898 | 4/1987 | Paul et al. | 166/275 |

*Primary Examiner*—Allan M. Lieberman
*Attorney, Agent, or Firm*—Alexander J. McKillop; Charles J. Speciale

[57] ABSTRACT

Polymers and gels useful for permeability control in subterranean formations, said polymers having structural forms of ABA triblocks and $(AB)_n$ multiblock are disclsoed.

4 Claims, 2 Drawing Sheets

TYPE 1

TYPE 2

TYPE 3

RESERVOIR ROCK

BLOCK COPOLYMERS USEFUL FOR ENHANCED OIL RECOVERY PROCESSES

This is a continuation of U.S. application Ser. No. 780,133, filed on Sept. 25, 1985, now abandoned.

BACKGROUND OF THE INVENTION

The present invention relates to block copolymers and, more particularly, to block copolymers which are especially adapted for utilization in enhanced oil recovery procedures.

Subterranean oil producing formations generally have variable permeability. In zones where permeability stratification exists, the water flooding or other displacing fluid used in producing oil, sweeps fastest through the more permeable zones so that much of the oil in the less permeable zones must be produced at high water (fluid)-oil ratios.

Polymer gels are often used to control the reservoir permeability profile. Effective gels require good strength to withstand long term waterflooding. Additionally, these polymer gels require good shear stability to ensure minimum structural degradation during the polymer/gel injection process and good injectivity so that the polymer/gel slug may be pumped to a desirable depth of penetration with minimum amount of shear degradation.

Polymers and gels useful for permeability control, as described in the prior art, are generally homopolymers and random copolymers. These polymers generally form homogeneous solutions and uniform bulk gels when crosslinked. While crosslinking improves the mechanical strength of the polymers as the degree of crosslinking increases, the flow character of the polymer gel decreases and thus its injectivity is impaired. Thus, as a general rule, maximum gel strength and good injectivity are not realized simultaneously in the preparation of a permeability control agent from known homopolymers and random copolymers utilizing standard crosslinking techniques. The optimum gel strength and injectivity are comprised in such cases.

A further difficulty in polymer gel preparations wherein the commonly employed transition metal crosslinkers, e.g., Cr(III), Al(III), Zr(IV) and Ti(IV), are used is that these crosslinkers are deactivated in reservoirs where brine carbonate, bicarbonate and other anion concentrations are high.

Accordingly, it is desirable to provide new polymers which can be crosslinked to maximum gel strength without sacrificing injectivity. It is also desirable to provide new polymers which can be crosslinked in the presence high brine reservoir water.

SUMMARY OF THE INVENTION

Accordingly, it is one object of the present invention to provide novel block copolymers which are particularly well suited for use in enhanced oil recovery processes.

Another object of this invention is to provide block copolymers which when crosslinked yield maximum strength gels also have excellent injectivity.

Still another object of the present invention is to provide block copolymers which are crosslinkable in high brine concentration reservoirs.

These and other objects are accomplished herein by providing three novel types of block copolymers:

(1) Copolymers which are crosslinked by reactivity with chemical crosslinkers;
(2) Copolymers which do not require chemical crosslinkers, but form gels by chain entanglement in high brine reservoir; and
(3) Copolymers which contain petrophilic segments which are strongly absorbed by the reservoir rocks.

DETAILED DESCRIPTION OF THE INVENTION

Figure 1:
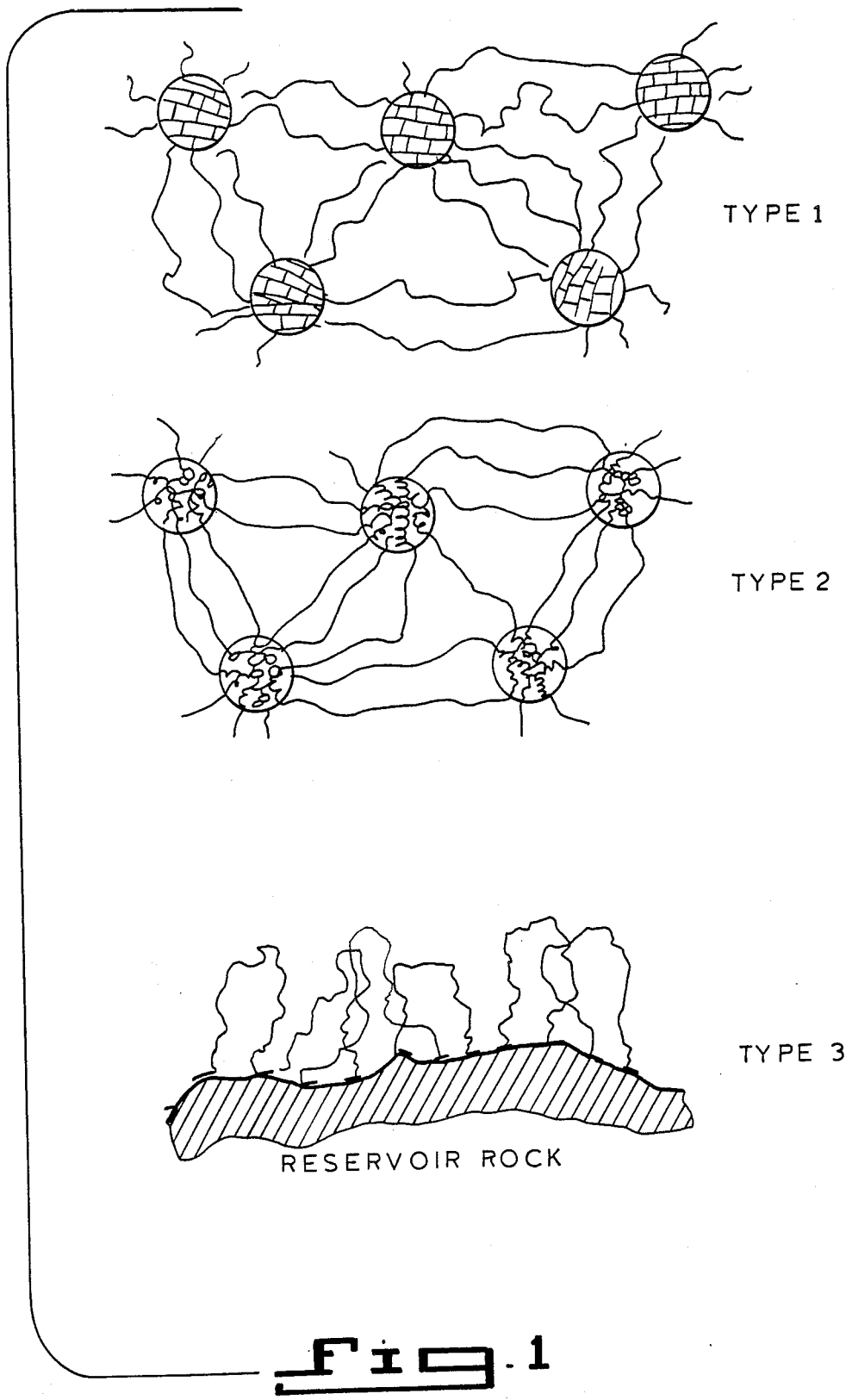
FIG. 1 is an illustration depicting the morphology of the three types of block copolymers according to the present invention.
Figure 2:
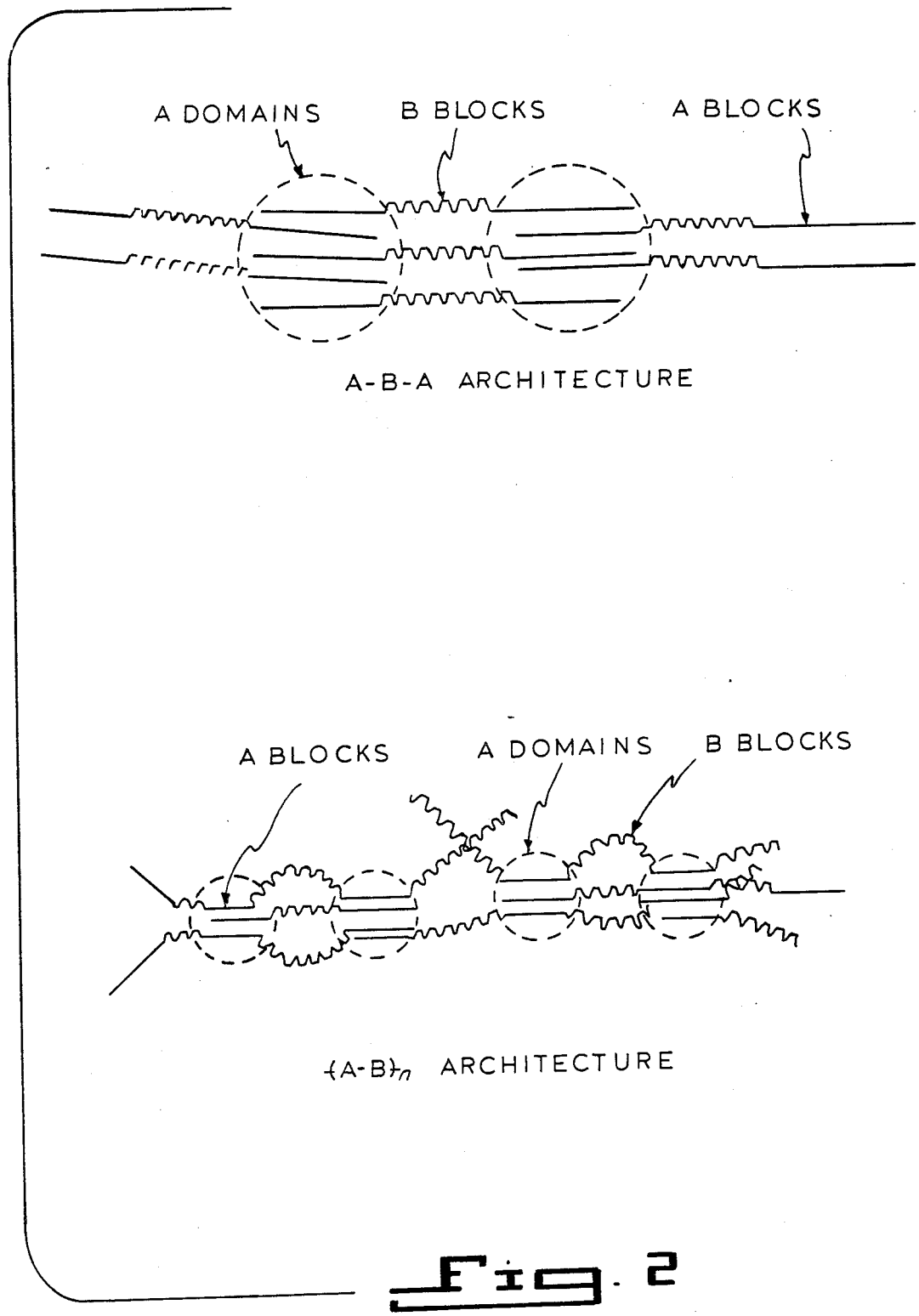
FIG. 2 is a schematic representation of various block copolymer architectures.

In accordance with the present invention, three new types of block copolymers in the structural form of ABA triblock or $(AB)_n$ multiblock copolymers, useful for controlling the reservoir permeability profile in enhanced oil recovery operations, are provided. These three types of block copolymers are prepared by combining physically and chemically different block segments A and B. The three types of new polymers can be categorized as follows:

Type 1: Crosslinking reactivity
Type 2: Polymer chain conformation changes in brine
Type 3: Adsorptivity to reservoir rocks Type 1 polymer, upon crosslinking, forms a gel consisting of highly crosslinked domains suspended in a continuous phase of non- or lightly crosslinked polymers. This type of polymer has a morphology similar to thermoplastic elastomers comprised of both amorphous and crystalline blocks. Instead of being held together by microcrystalline structures as in the case of thermoplastic elastomers, the Type 1 polymer has suspended domains joined by chemical bonds (FIG. 1). The crosslinked internal phase gives the gel strength while the continuous phase gives it injectivity and shear stability.

The Type 2 polymer has a brine sensitive A block which assumes a coiled conformation in high brine concentration. These coiled A blocks cause severe chain entanglement among other A blocks and form a physically crosslinked gel. The morphology of such a gel is similar to that of Type 1 polymer gel (FIG. 1).

The Type 3 polymer has "petrophilic" A blocks which adhere to the surface of reservoir rocks and B blocks which have little or no affinity to rock and stay in the aqueous phase. Depending upon the chain length of the B block, chain entanglement may occur to form a gel-like material which modifies the flow characteristics in channels filled by this material (FIG. 1).

Polymers and gels so prepared are extremely strong, shear stable and are also easy to inject.

Table 1 below summarizes the chemical and physical properties that the A and B blocks embody. The common property for B block is brine tolerance.

TABLE 1

| Polymer Type | A Block | B Block |
| --- | --- | --- |
| 1 | Highly reactive towards crosslinkers or having high density of crosslinkable functional groups | Low degree of crosslinking reactivity or having low density of crosslinking sites |
| 2 | Sensitive to high brine concentration, polymer | Brine tolerant |

TABLE 1-continued

| Polymer Type | A Block | B Block |
|---|---|---|
| | chain coils up under such conditions | |
| 3 | High affinity to rocks and clays, usually positive charged | Low degree of affinity to reservoir rocks and clays |

More particularly, type one block polymers (ABA, $(AB)_n$ have B blocks that are non-crosslinkable or have low reactivity toward crosslinking agents. The A block is crosslinkable and, in fact, has high reactivity to crosslinkers. Representative examples are listed in Table 2.

TABLE 2

| Example | A | B | Crosslinkers |
|---|---|---|---|
| 1 | Polyacrylic acid | Polyacrylamide | Al, Cr, Zr, Ti, etc. |
| 2 | Partially hydrolyzed polyacrylamide | Polyacrylamide | Al, Cr, Zr, Ti, etc. |
| 3 | Highly hydrolyzed polyacrylamide | Mildly hydrolyzed polyacrylamide | Al, Cr, Zr, Ti, etc. |
| 4 | Partially hydrolyzed polyacrylic ester | Polyacrylamide | Al, Cr, Zr, Ti, etc. |
| 5 | Highly hydrolyzed polyacrylic ester | Polyacrylamide or mildly hydrolyzed polyacrylamide | Al, Cr, Zr, Ti, etc. |
| 6 | Polyvinyl alcohol | Polyacrylamide | Borax, boric acid, Ti |
| 7 | Polyvinyl alcohol | Polyalkylene ethers | Borax, boric acid, Ti |
| 8 | Polyacrylic acid; partially hydrolyzed ester and polyacrylamide | Polyalkylene ethers | Al, Cr, Zr, Ti |
| 9 | Polyacrylic acid; partially hydrolyzed ester and polyacrylamide | Polyvinyl alcohol | Al, Cr, Zr, Ti |
| 10 | Polyacrylic acid, partially hydrolyzed polyacrylic ester and polyacrylamide | Polyvinylpyridine | Al, Cr, Ti, Zr, etc. |
| 11 | Polyvinyl alcohol | Polyvinylpyridine | Borax, boric acid, Ti |

Obviously, other block copolymers with crosslinkable A block reactive to crosslinkers other than the ones listed in the above Table 2 may also be used.

Upon contact with appropriate crosslinkers, these polymers form gels with isolated crosslinked microdomains and a continuous non- or low degree crosslinked phase. The crossliked domains contribute to gel strength and the continuous phase contributes to the injectivity since it provides deformability. Deformability also contributes to the gel's shear stability. The longer the B segment, the higher the deformability. The B segment should have a degree of polymerization (DP) of 10,000 to 600,000, preferably 20,000 to 400,000. The preparation of these block copolymers may be followed by anionic living addition polymerization methods. The DP is determined by the ratio of monomer to initiator. A more complete description of these and similar block copolymers can be found in "Block Copolymers Overview and Critical Survey" by Noshay and McGrath, Academic Press, New York, 1977.

Polymers containing brine sensitive A blocks are selected from the ABA and $(AB)_n$ type two block copolymers. The brine sensitive A segments will coil up in high brine environment forming entangled A segments that function as physical crosslinks. Injecting such polymer into a high brine reservoir will trigger this chain entanglement and therefore will provide the viscosity and gel strength. Therefore, the need to use crosslinker is eliminated. A sodium polyacrylate segment is suitable for the brine sensitivity block. Highly hydrolyzed polyacrylamide may also be employed. The degree of hydrolysis of such polymers should be over 30%. Hydrolyzed polyacrylic ester in anionic forms is also suitable. Representative examples of such block copolymers can be any combination of the listed A and B block below:

TABLE 3

| A Block | B Block |
|---|---|
| Polyacrylic-Na | PAM, PVA |
| Partially hydrolyzed PAC ester | Polyvinylpyridine |
| | Polyalkylene ethers |
| Partially hydrolyzed PAM | Xanthan |

The chain length of the A segment determines the degree of chain entanglement which ultimately determines the gel strength. The chain length of the B segment contributes flexibility to the gel.

The DP (degree of polymerization) of B blocks are in the range of 10,000 to 600.000, preferably 20,000 to 400,000. The DP of A blocks are in the range of 1,000 to 200,000, preferably 5,000 to 150,000. The synthesis is similar to that of type one block copolymer described earlier.

Type Three Block Copolymers.

These polymers have "A" segments having high affinity to reservoir rocks (adsorption on rock surface) and B segments inert to rocks. A segments usually are positively charged such as cationic polyacrylamide. B blocks are neutral and are not adsorbed by rocks. Highly hydrolyzed polyacrylamide, known to be highly adsorbable by rocks, can also be used. Table 4 illustrates some representative examples of type three block copolymers.

| Example | A Block | B Block |
|---|---|---|
| 1 | Cationic polyacrylamide | 30% hydrolyzed polyacrylamide |
| 2 | Cationic polyacrylamide | Polyvinyl alcohol |
| 3 | Cationic polyacrylamide | Polyalkylene oxide |
| 4 | Cationic polyacrylamide | Polyvinylpyridine |
| 5 | Highly hydrolyzed PAM (30%) | Same as examples 1-4 |
| 6 | Polyacrylic acid or highly hydrolyzed polyacrylic esters | Same as examples 1-4 |

The DP of B blocks are from 10,000-600,000, preferably 20,000 to 400,000. The DP of A blocks are in the range from 1,000 to 200,000, preferably 5,000 to 150,000. The synthesis of these polymers is similar to that of type one and two block copolymers described.

The chain length of segment A determines the polymer's adsorptivity by reservoir rocks and the chain length of B segment determines the polymer's resistance to shearing flowing floodwater.

The three types of new block copolymers disclosed herein are useful for reservoir permeability profile control. These polymers possess high gel strength (when crosslinked), shear stability and good injectivity. Type one polymers are crosslinked by reactivity with chemical crosslinkers. Type two polymers need no chemical crosslinkers, but gel forms by chain entanglement in high brine reservoir water. Thus, the commonly employed crosslinking agents sensitive to carbonate, bicarbonate sulfates and other inhibitors are eliminated. The type three polymers have "petrophilic" segments and are strongly adsorbed by the reservoir rocks. The "petrophobic" segments form gel by chain entanglement and thus modify the flow characteristics of such reservoirs so treated.

The amount of the block copolymer used in the solutions employed for permeability and mobility control can vary widely depending on the particular copolymer desired and the properties desired in the gels. Generally speaking, amounts in the range of from about 0.01 to about 10, preferably from about 0.05 to about 5 weight percent based on the weight of water utilized to form aqueous injectable solutions can be used. Amounts outside this range, however, can also be used. Small amounts of copolymer will usually produced liquid mobile gels which can be readily pumped where as large amounts of copolymer will usually produce thick, viscous, some what elastic gels. The thick gels can be thinned by the dissolution of water to any desired concentration of copolymer and this can be done by mechanical means such as stirring, pumping, or by means of a suitable turbulence inducing device to cause shearing such as a jet nozzle. The precise concentration used is generally determined by the particular field conditions, such as the permeability ranges of various strata and their ratio. Thus, there is really no fixed upper limit on the amount of polymer which can be used.

In practicing the permeability control and enhanced oil recovery process of the present invention, in one embodiment, after initial brine injection, a mixture of copolymer solution and crosslinking solution (if necessary) is injected through a well into the subterranean formation. The mixture is directed to that portion of the subterranean formation where it is desired that the permeability be altered. After shutting off the well, for example, for about 16 to 48 hours, brine injection is resumed.

Obviously, other modifications and variations of the present invention are possible in light of the above teachings. It is therefore to be understood that changes may be made in the particular embodiments of this invention which are within the full intended scope of the invention as defined by the appended claims.

I claim:

1. A method for permeability control of a subterranean formation and for enhancing oil recovery from said subterranean formation, said method comprising injecting into said subterranean formation an aqueous solution comprised of a block copolymer having a segment which entangles in a high brine environment to function as a physical crosslink, and a segment which form a continuous non- or low degree crosslinked phase which is brine tolerant, and said block copolymer having the structural form of ABA triblock or $(AB)_n$ multiblock wherein A is a brine sensitive polymer block capable forming entangled segments, each said a polymer block being characterized by a degree of hydrolysis of over 30% and a degree of polymerization of 1,000 to 200,000, each B polymer block is a brine tolerant segment and n is a number of at least 2, each said B polymer block having a degree of polymerization of 10,000 to 600,000.

2. The method of claim 1 wherein A is selected from the group consisting of sodium polyacrylate, partially hydrolyzed polyacrylate and partially hydrolyzed polyacrylamide and B is selected from the group consisting of polyacrylamide, polyvinylalcohol, polyvinylpyridine, polyalkylene ethers and xanthan.

3. The method of claim 1 wherein said degree of polymerization of said A polymer block is 5,000 to 150,000 and said degree of polymerization of said B polymer block is 20,000 to 400,000.

4. The method of claim 1 wherein said block copolymer is provided in a ratio in which coiled A polymer blocks cause severe chain entanglement among other A polymer blocks and form a physically crosslinked gel, and said B polymer block or polymer blocks is present in sufficient amount to provide injectivity.

* * * * *